Sept. 15, 1931.  A. BRAUN  1,822,880
SPEED CONTROLLING DEVICE FOR VEHICLES
Original Filed April 28, 1924  3 Sheets-Sheet 1

INVENTOR
Adolf Braun
BY
Abel L. Brownrigg
ATTORNEY

Sept. 15, 1931.  A. BRAUN  1,822,880
SPEED CONTROLLING DEVICE FOR VEHICLES
Original Filed April 28, 1924  3 Sheets-Sheet 2

INVENTOR
Adolf Braun
BY
Abel L. Browning
ATTORNEY

Sept. 15, 1931.  A. BRAUN  1,822,880
SPEED CONTROLLING DEVICE FOR VEHICLES
Original Filed April 28, 1924  3 Sheets-Sheet 3
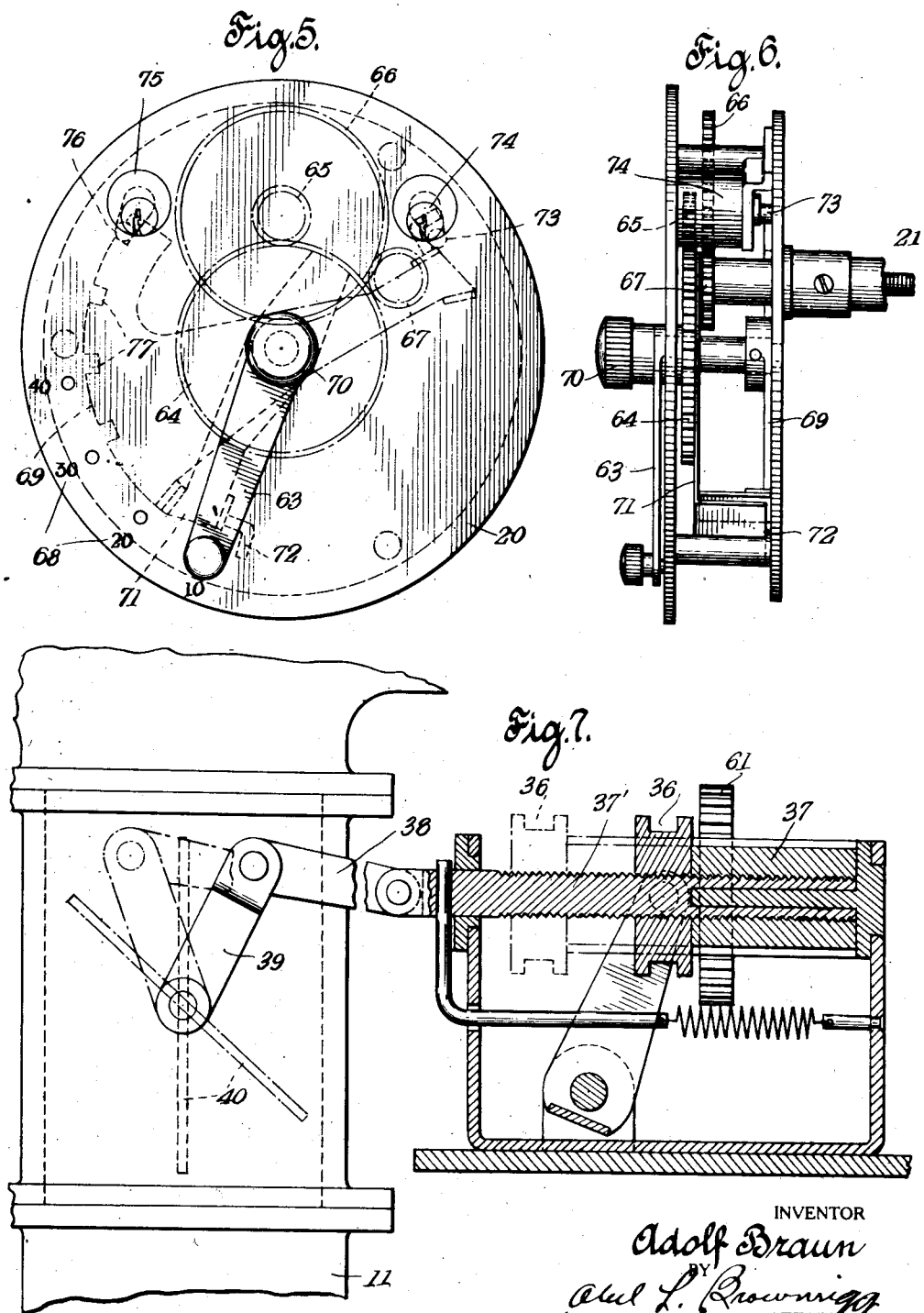

Patented Sept. 15, 1931

1,822,880

UNITED STATES PATENT OFFICE

ADOLF BRAUN, OF NEW YORK, N. Y.

SPEED CONTROLLING DEVICE FOR VEHICLES

Application filed April 28, 1924, Serial No. 709,697. Renewed August 15, 1930.

This invention relates generally to speed controlling means for automotive vehicles.

A general object of the invention is to provide a controlling device of the general nature referred to which will function both to limit the speed of travel of the vehicle and to prevent racing or excessive speed of rotation of the engine when unclutched from driving engagement with the propelling gear of the vehicle.

The invention includes a speed responsive device operable when a predetermined maximum speed condition has been exceeded for closing a control valve in the intake pipe of the engine, the speed responsive device being coupled directly to the engine when the vehicle itself is not in motion and arranged to be automatically disconnected from the engine and coupled to a moving part of the vehicle when the vehicle is in motion. By this arrangement the speed control device acts to prevent injurious racing of the engine when the clutch is disengaged and the engine is running without load and, what is equally important, the placing of the control in a moving part of the vehicle when the vehicle is in motion makes it possible to utilize a set of speed conditions which will permit the operation of the engine at a speed to deliver an output of power suited to the maximum load conditions likely to be encountered.

Another feature of the invention resides in the provision of mechanism for setting the control mechanism to operate at different maximum speeds and also for locking the control valve in closed position to prevent the unauthorized use of the vehicle.

Still another feature resides in the provision of signaling means automatically operable at any predetermined speed to indicate that an excessive speed has been reached.

In the drawings, in which a preferred embodiment of the invention has been selected for illustration, Figure 1 is a view in side elevation and partly in section of the forward portion of an automobile equipped with a speed control device embodying the invention.

Figure 5 is a view in front elevation of a dial setting device for the control mechanism.

Figure 6 is a view in side elevation of the device shown in Figure 5.

Figure 7 is a view in vertical longitudinal section and on an enlarged scale of the device shown in Figure 4, including the control valve operated by the device.

Figure 1:
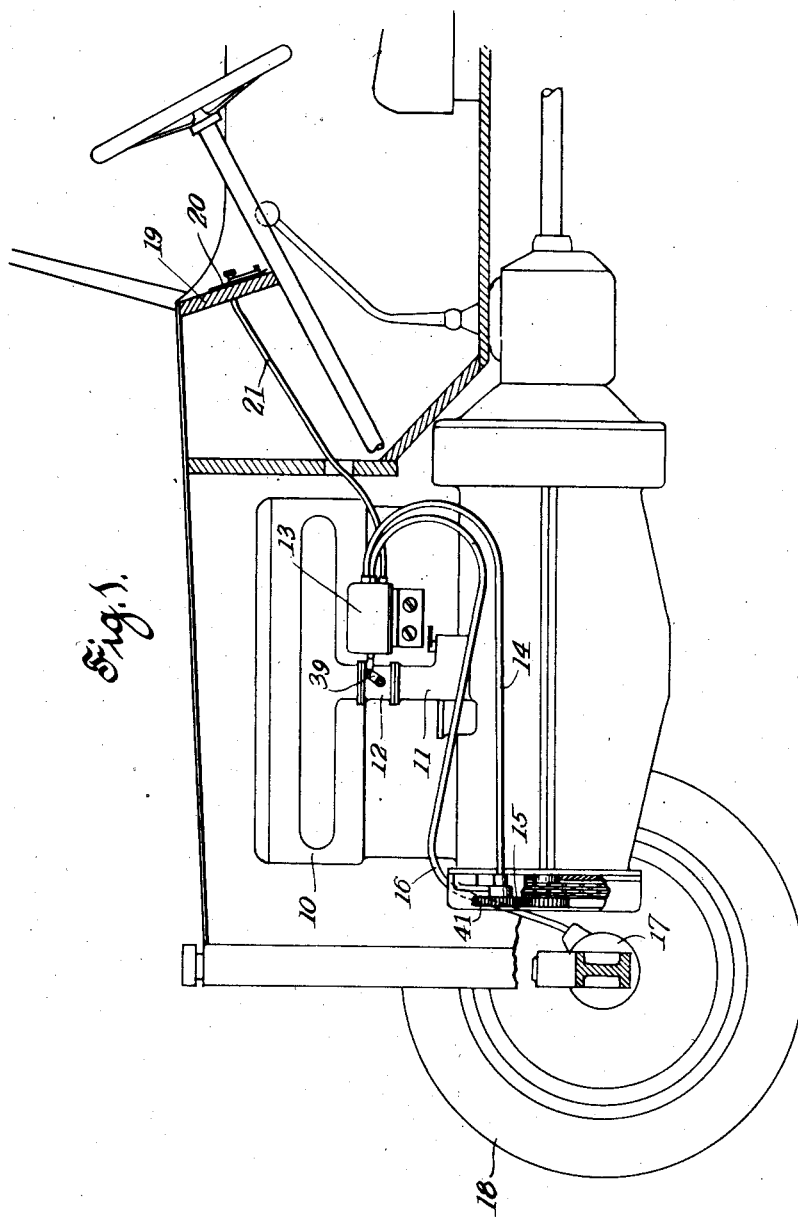

Referring to the drawings for a more detailed description of the invention, in Figure 1 of the drawing there is shown the forward portion of an automobile in which there is included an outline view of an engine 10 having an intake pipe 11 in which there is placed a valve casing 12 having a valve included therein which has an operative connection with a speed control mechanism enclosed in a casing 13.

A flexible driving connection 14 extends from the engine-driven timing mechanism 15 into the casing 13 and a corresponding driving connection 16 extends from a gear on the hub 17 of a front wheel 18 into the casing 13.

On the dash board 19 of the car there is mounted a dial plate 20 which is provided with setting mechanism connected through a flexible control member 21 with mechanism in the casing 13.

Figure 2:
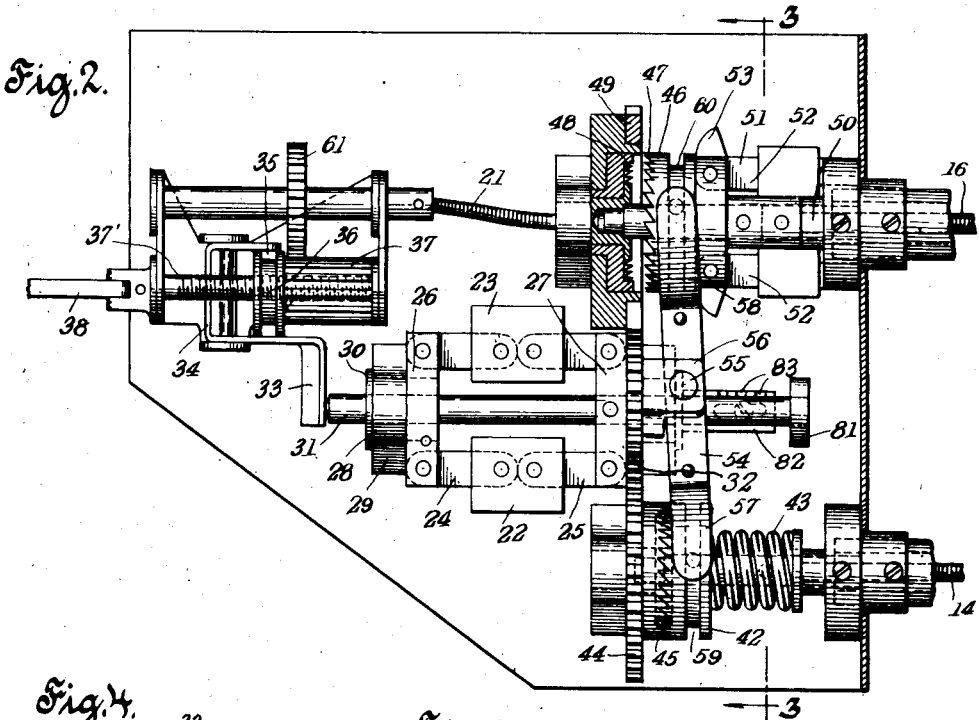
Figure 2 is a plan view of the speed responsive mechanism included in the control device shown in Figure 1.

In Figure 2 of the drawings there is shown in plan view speed control mechanism enclosed in the casing 13. This mechanism includes a centrifugal governor 22 including weight members 23 joined to links 24 and 25 which are attached at their other ends respectively to the cross arms 26 and 27. The cross arm 26 is attached to a hub member 28 rotatable in a fixed bearing 29, the hub being provided with a flange 30 to prevent longitudinal movement of the hub member 28 with relation to the bearing support 29.

The oppositely disposed cross arm 27 is attached at its central portion to a shaft 31 which has a splined connection with a gear 32 by which the shaft is rotated. By means of the splined connection with the gear the shaft is longitudinally movable through the axial movement of the cross arm 27 which is brought about by the outward movement of the weight members 23 under centrifugal action.

In operation when the speed of rotation of the centrifugal device 22 exceeds a predetermined degree the shaft 31 is moved to the left into engagement with an arm 33 which forms an extension of a pivoted fork member 34 having inwardly projecting lugs 35 which engage a circumferential groove 36 provided at one end of an elongated gear member 37 which is provided with an elongated extension 37' having a link connection 38 with the operating arm 39 of a butterfly valve 40 operating in the valve casing 12 which is set in the intake pipe 11 of the engine. The swinging of the arm 33 to the left as viewed in Figure 4 of the drawing produces a corresponding movement of the link 38 to the left and thereby swings the valve 40 to a position in which it acts to close the fuel supply passage of the engine to thereby bring about a diminution of the speed of operation thereof.

Means are provided for connecting the operating gear 32 for the centrifugal governor either directly to the engine in order to prevent racing thereof when uncoupled to the vehicle driving gear, or directly to a moving part of the vehicle such as the front wheel in order to place the engine directly under the control of the moving vehicle. The means thus provided is so constructed and arranged that when the engine is running in uncoupled condition with relation to the driving gear the centrifugal governor is directly connected to the engine, and, on the other hand, when the vehicle is itself in motion the connection between the centrifugal governor and the engine is broken and in lieu thereof there is substituted a connection between the centrifugal governor and the moving vehicle. By this arrangement a control is exercised over the engine when running without a load and at the same time a flexible control is exercised over the engine when coupled to the driving gear of the vehicle so as to enable the engine to run at a necessary speed to deliver power for any given load requirement.

The means referred to includes the flexible shaft 14 already referred to which is connected at one end to an engine-driven gear 41 in the timing mechanism 15 and at the other end to a clutch member 42 which is normally pressed by a spring 43 into clutching engagement with a gear 44 provided with clutch teeth 45. It will be seen that with this construction the rotation of the gear 41 is directly conveyed to the clutch member 42, and when the clutch member is in coupled engagement with the teeth 45, to the gear 44 which is in meshing engagement with the governor-driving gear 32 already referred to. This driving connection serves to control the speed of the engine and prevent it from racing when the engine is running free, that is, without load.

The other control referred to, that is, the control exercised by the movement of the vehicle itself, resides in a mechanical connection provided between the front wheel 18 of the vehicle through a flexible drive member 16 and a clutch member 46 mounted within the casing 13 on the opposite side of the gear 32 to that occupied by the clutch 42. The clutch member 46 is provided with teeth 47 which are adapted to cooperate with teeth 48 carried by a gear 49 which is arranged in meshing engagement with the governor operating gear 32 as is clearly shown in Figure 2 of the drawings. The clutch member 46 coupled to the flexible driving shaft 16 is normally out of engagement with the teeth on the gear 49. In order to move the clutch member 46 into driving engagement with the gear 49 the extension shaft 50 on which the clutch member 46 is mounted is provided with a centrifugal governor device 51. The governor carries weighted arms 52 which are provided at one end with cam members 53 which are adapted to engage the clutch member 46 and force it into clutching relation with the gear 49 when the weighted arms 52 are moved outwardly under the action of centrifugal force.

When the clutch member 46 is moved into engagement with the gear 49 to thereby bring about driving engagement between the front wheel 18 of the car and the gear 49, the clutch member 42 at the end of the engine shaft 14 is moved out of engagement with the gear 44 through the swinging movement of an arm 54 which is fulcrumed at 55 on a bracket 56 and whose forked extremities 57 and 58 engage respectively with grooves 59 and 60 in the clutch members 42 and 46. Normally the spring member 43 produces a clutched condition of the engine shaft 14 with the gear 44 and an unclutched condition of the vehicle wheel-driven shaft 16 and the gear 49 as will be seen.

When the shaft 16 is coupled to the gear 49 through the rotation of the shaft 16 and the consequent operation of the governor 52 it will be seen that the operation of the centrifugal governor 22 is placed in the moving vehicle wheel and removed from the engine shaft so that the engine is now controlled by the speed of movement of the car.

Figure 4:
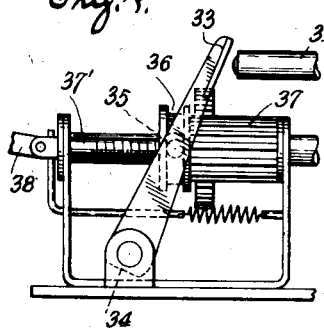
Figure 4 is a view in side elevation of a valve operating part of the mechanism shown in Figure 2.
Figure 3:
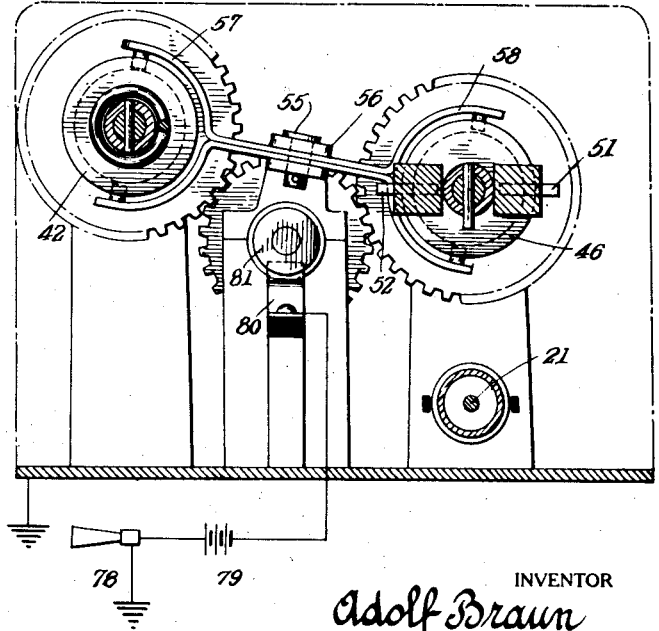
Figure 3 is a view in vertical section taken on the line 3—3 of Figure 2.

In order to provide settings of the control mechanism which will cause the control mechanism to operate at different speeds the elongated spur gear 37 is rotated on the extension shaft 37' with which the gear 37 has threaded engagement. The gear 37 is rotated on the shaft 37' to bring about a placement of the gear 37 at different positions axially of the shaft 37' through the medium of a gear 61 which has a flexible connection 21 with a manually operable setting arm or lever 63 carried on the dial 20 already referred to, in a position accessible to the driver of the vehicle. A multiplying gear connection including the gears 64, 65, 66 and 67 serves to increase the turning movement produced by the operation of the arm 63 to thereby rotate the gear 37 to bring about the desired movement thereof along the extension shaft 37'. It will be seen that the movement of the gear 37 axially of the shaft 37' operates to rock the forked framework 34 about its pivotal point to thereby swing the arm 33 to different angular positions. It will be seen that the position of the arm 33 with relation to the operating shaft 31 as indicated in Figure 4 of the drawing will determine to what extent the shaft 31 must be moved by the centrifugal governor 22 to engage and effect a rocking movement of the arm 33 to produce a corresponding closing movement of the control valve 40 in the intake pipe 11 of the engine.

In order to set the arm 63 at points corresponding to fixed speed limits the dial 20 is provided with calibrations as at 68 which correspond to various settings that may be made. In order to prevent the swinging of the arm 63 beyond a maximum predetermined speed limit a stop member 69 is provided which can be rotated through a knob member 70 to swing the stop member 69 to different angular positions. The stop member 69 is adapted to be engaged by an arm 71 carried by the shaft on which the arm 63 is mounted and which engages the edge of the stop member 69 in whatever position in which it may be placed. The arm 71 is also provided with a hook member 72 which can be interlocked with a latch member 73 carried by a lock 74 in order to hold the arm in a position which will completely shut off the control valve 40 through the rotation of the gear 37 which will move the shaft 37' to its extreme left-hand limit.

The stop member 69 can be locked in various positions through a lock 75 provided for the purpose in which a latch member 76 is moved into engagement with notches 77 provided in the periphery of the stop member 69. Thus it will be seen that a predetermined operating speed can be established by the position of the stop member 69 and that this position can be maintained by means of the lock 75. It will also be seen that the arm 63 can be swung to a position wherein it is engaged by the lock 74 to prevent unauthorized use of the car.

I contemplate also the use of a signaling device shown diagrammatically as a horn 78 to sound an alarm when an excessive speed has been reached. The horn 78 is shown in circuit with a battery 79 and a fixed contact 80 adapted to be engaged by a movable contact 81 carried on a rearward extension 82 of the shaft 31. The position of the contact 81 may be adjusted longitudinally of the shaft in accordance with calibrations 83 provided thereon in order to cause the signaling means to operate at different predetermined speeds. While a horn has been shown as a typical form of signaling means it will be clear that a bell or other noise producing means or visual signal may be used where circumstances so require.

What I claim is:—

1. In a device for controlling the speed of automotive vehicles, valve means for controlling the fuel supply to the engine, speed-responsive means for operating the valve, means normally connecting an engine-driven part to the speed-responsive means, and a centrifugal device responsive to movement of the vehicle for disconnecting the engine from the speed-responsive means and connecting the speed responsive means to a moving part on the vehicle.

2. In a device for controlling the speed of automotive vehicles, valve means for controlling the fuel supply to the engine, speed responsive means for operating the valve, means including a clutch for connecting an engine-driven part to the speed-responsive means, means including a clutch for connecting the speed-responsive means to a part moved by the movement of the vehicle, and centrifugal means responsive to movement of the vehicle for disconnecting the clutch in the engine-driven connection and causing the other clutch to engage, whereby to operate the speed-responsive device through connection with the part moved by the vehicle.

3. In a device for controlling the speed of automotive vehicles, valve means for controlling the fuel supply to the engine, speed-responsive means for operating the valve, means including a clutch for connecting an engine-driven part to the speed responsive means, means including a clutch for connecting the speed-responsive means to a part moved by the movement of the vehicle, means connecting said clutches to move one of the clutches into engaging position when the other moves out of engaging position and vice versa, and centrifugal means in said means for connecting the speed responsive means to a part moved by the movement of the vehicle for connecting the clutch therein and causing the engine-driven clutch to disengage, whereby to operate the speed-responsive device through the connection with the part moved by the vehicle.

ADOLF BRAUN.